US009594196B2

(12) United States Patent
Hayakawa et al.

(10) Patent No.: US 9,594,196 B2
(45) Date of Patent: Mar. 14, 2017

(54) LIGHT DEFLECTOR AND IMAGE FORMING APPARATUS (71) Applicant: Brother Kogyo Kabushiki Kaisha, Nagoya-shi, Aichi-ken (JP)

(72) Inventors: Kazuhiro Hayakawa, Nagoya (JP); Yoichi Kojima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/079,117

(22) Filed: Mar. 24, 2016

(65) Prior Publication Data
US 2016/0282524 A1    Sep. 29, 2016

(30) Foreign Application Priority Data

Mar. 24, 2015   (JP) ................................. 2015-061418

(51) Int. Cl.
G03G 15/04      (2006.01)
G02B 26/10      (2006.01)
G02B 5/09       (2006.01)
G02B 26/12      (2006.01)
G03G 15/043     (2006.01)

(52) U.S. Cl.
CPC .............. *G02B 5/09* (2013.01); *G02B 26/121* (2013.01); *G03G 15/043* (2013.01); *G03G 15/04036* (2013.01)

(58) Field of Classification Search
CPC ....... G03G 15/04036; G03G 15/04072; G03G 15/043; G03G 2215/04; G03G 2215/0402; G02B 5/09; G02B 26/10; G02B 26/12; G02B 26/121; B41J 2/471

USPC .......... 399/4; 359/200.1; 347/245, 256, 257, 347/260, 261, 263
See application file for complete search history.

(56) References Cited

U.S. PATENT DOCUMENTS 8,711,196 B2    4/2014  Chun et al.
2007/0146852 A1*  6/2007  Itami ....................... G02B 5/09
                                                             359/200.1

(Continued)

FOREIGN PATENT DOCUMENTS

JP    S61-203721 U    12/1986
JP    H08-118496 A    5/1996
JP    2012-118532 A   6/2012

Primary Examiner — Sophia S Chen
(74) Attorney, Agent, or Firm — Banner & Witcoff, Ltd.

(57) ABSTRACT

Light deflector includes: polygon mirror made of plastic and having reflecting surfaces; motor rotatable on a rotation axis; and rotor rotatable by the motor, and including base portion intersecting the axis of rotation, and first protruding portion having circular cylindrical shape and protruding from the base portion in a rotation-axis direction. The polygon mirror has inner surface contacting outer peripheral surface of the first protruding portion, and bottom surface facing to the rotor in the rotation-axis direction. The bottom surface has contacting portion contacting the base portion, and the contacting portion overlaps a line segment connecting the rotation axis and any of vertexes of the polygon mirror viewed from the rotation-axis direction. The bottom surface has non-contacting portion spaced apart from the base portion, and the non-contacting portion overlaps a perpendicular dropped from the rotation axis to any of the reflecting surfaces viewed from the rotation-axis direction.

19 Claims, 6 Drawing Sheets (56) References Cited

U.S. PATENT DOCUMENTS

| | | |
|---|---|---|
| 2012/0141167 A1 | 6/2012 | Chun et al. |
| 2014/0198171 A1 | 7/2014 | Chun et al. |
| 2015/0226958 A1* | 8/2015 | Hayakawa ............. G02B 26/12 359/200.1 |
| 2015/0248077 A1* | 9/2015 | Hoshino .......... G03G 15/04036 399/216 |
| 2015/0346485 A1* | 12/2015 | Hayakawa ....... G03G 15/04036 359/221.2 |

* cited by examiner

LIGHT DEFLECTOR AND IMAGE FORMING APPARATUS

CROSS REFERENCE TO RELATED APPLICATIONS

The present application claims priority from Japanese Patent Application No. 2015-061418 filed on Mar. 24, 2015, the disclosure of which is incorporated herein by reference in its entirety.

TECHNICAL FIELD

An aspect of this disclosure relates to a light deflector comprising a polygon mirror made of plastic, and an image forming apparatus comprising such a light deflector.

BACKGROUND ART

A conventionally known light deflector includes a polygon mirror made of plastic, and a motor including a rotor configured to support the polygon mirror. The rotor includes a base portion and a protruding portion protruding from the base portion. The polygon mirror has a through-opening at a center portion thereof, and the protruding portion of the rotor is inserted into the through-hole and the base portion of the rotor comes into contact with a bottom surface of the polygon mirror, so that the polygon mirror is attached to the rotor.

However, in this conventionally known light deflector, the surface of the base portion around the protruding portion entirely contacts the bottom surface of the polygon mirror, so that heat generated by the motor is easily transferred to the bottom surface of the polygon mirror. Therefore, the heat from the motor may be transferred to the reflecting surfaces of the polygon mirror through the bottom surface, and the reflecting surfaces may undergo a deformation due to thermal expansion.

In view of the above, it would be desirable to provide a light deflector which can suppress deformation of the reflecting surfaces of the polygon mirror due to thermal expansion of the reflecting surfaces.

SUMMARY

According to a first aspect, there is provided a light deflector comprising: a polygon mirror made of plastic and having a plurality of reflecting surfaces; a motor configured to rotate on an axis of rotation; and a rotor configured to be rotatable by the motor, and including a base portion intersecting the axis of rotation, and a first protruding portion having a circular cylindrical shape and protruding from the base portion in a direction of the axis of rotation. The polygon mirror has an inner surface contacting an outer peripheral surface of the first protruding portion of the rotor, and a bottom surface facing to the rotor in the direction of the axis of rotation. The bottom surface of the polygon mirror has a contacting portion configured to contact the base portion of the rotor, and the contacting portion overlaps a line segment connecting the axis of rotation and any of vertexes of the polygon mirror viewed from the direction of the axis of rotation. The bottom surface of the polygon mirror has a non-contacting portion configured to be spaced apart from the base portion of the rotor, and the non-contacting portion overlaps a perpendicular dropped from the axis of rotation to any of the reflecting surfaces viewed from the direction of the axis of rotation.

According to a second aspect, there is provided an image forming apparatus comprising: a photoconductor configured to carry an electrostatic latent image; a light source configured to emit a light beam; a light deflector configured to deflect the light beam emitted from the light source; and a scanning lens configured to focus the light beam deflected by the light deflector on the photoconductor.

The light deflector comprises: a polygon mirror made of plastic and having a plurality of reflecting surfaces; a motor configured to rotate on an axis of rotation; and a rotor configured to be rotatable by the motor, and including a base portion intersecting the axis of rotation, and a first protruding portion having a circular cylindrical shape and protruding from the base portion in a direction of the axis of rotation. The polygon mirror has an inner surface contacting an outer peripheral surface of the first protruding portion of the rotor, and a bottom surface facing to the rotor in the direction of the axis of rotation. The bottom surface of the polygon mirror has a contacting portion configured to contact the base portion of the rotor, and the contacting portion overlaps a line segment connecting the axis of rotation and any of vertexes of the polygon mirror viewed from the direction of the axis of rotation. The bottom surface of the polygon mirror has a non-contacting portion configured to be spaced apart from the base portion of the rotor, and the non-contacting portion overlaps a perpendicular dropped from the axis of rotation to any of the reflecting surfaces viewed from the direction of the axis of rotation.

These and other aspects will become apparent from the following description taken in conjunction with the accompanying drawings.

DETAILED DESCRIPTION

A detailed description will be given of an illustrative disclosure with reference to the accompanying drawings. In the following description, a general arrangement of a laser printer 1 according to an illustrative disclosure will be described, and thereafter characteristic features of a light deflector will be described in detail.

In the following description, the direction of the laser printer 1 is designated as from the viewpoint of a user who is using (operating) the laser printer 1. To be more specific, in FIG. 1, the left-hand side of the drawing sheet corresponds to the "front" side of the laser printer 1, the right-hand side of the drawing sheet corresponds to the "rear" side of the laser printer 1, the back side of the drawing sheet corresponds to the "left" side of the laser printer 1, and the front side of the drawing sheet corresponds to the "right" side of the laser printer 1. Similarly, the direction extending from top to bottom of the drawing sheet corresponds to the "vertical" or "upper-lower" direction of the laser printer.

Figure 1:
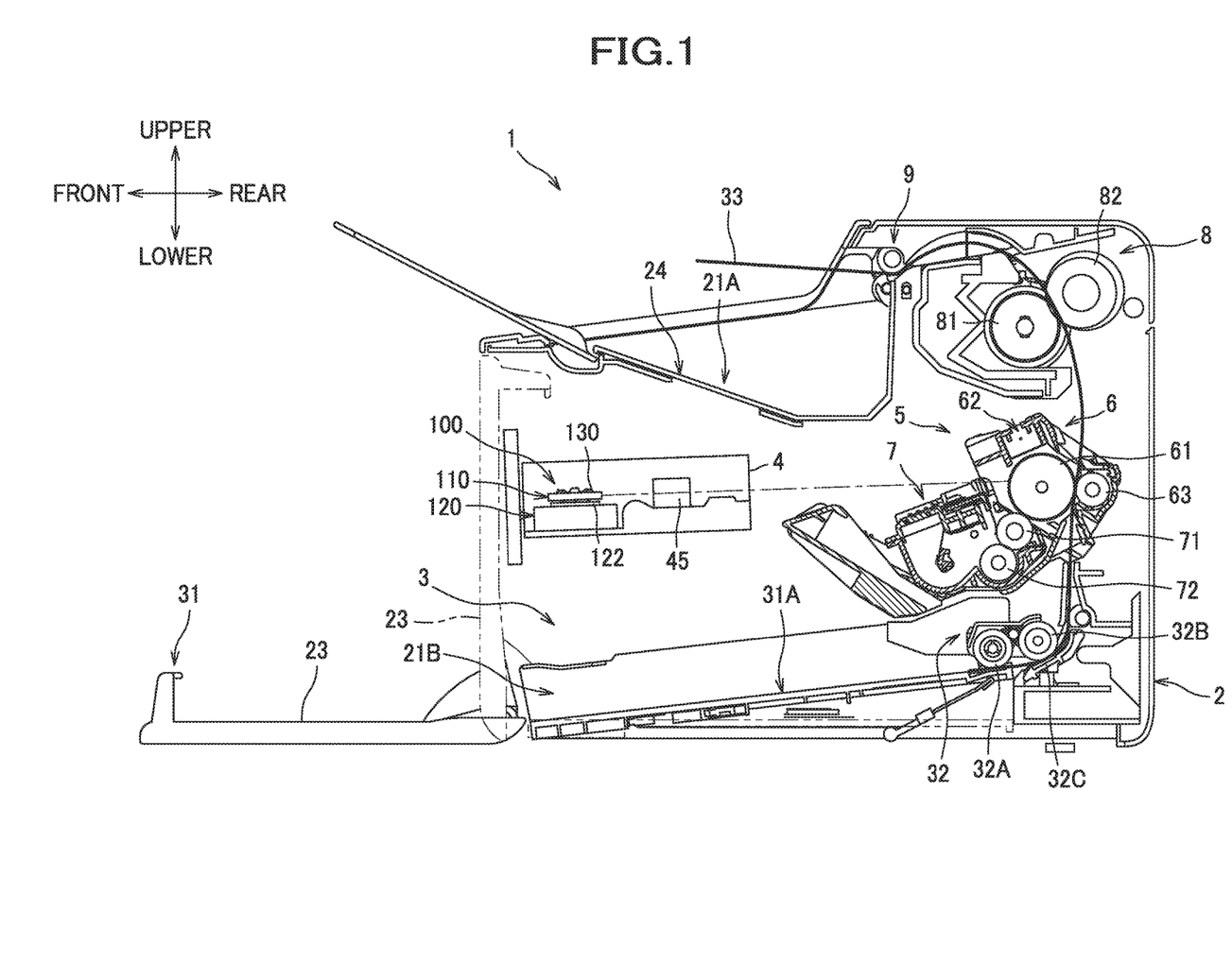
FIG. 1 is a sectional view of a laser printer.

As seen in FIG. 1, a laser printer 1 mainly includes a main body casing 2, a feeder unit 3, a scanner 4, a process cartridge 5, and a fixing device 8.

The main body casing 2 is provided with a front cover 23 pivotally supported by the main body casing 2. When the front cover 23 is swung forward into a lying back position to open an insertion slot 21B, a stack of sheets 33 can be inserted into the main body casing 2 through the insertion slot 21B.

The feeder unit 3 is located in a lower portion of the main body casing 2. The feeder unit 3 mainly includes a sheet feed tray 31 for receiving sheets 33, and a sheet feed mechanism 32 for feeding a sheet 33 from the sheet feed tray 31.

The sheet feed tray 31 includes a sheet receiving plate 31A disposed at the lower portion of the main body casing 2 and the above-described front cover 23. The sheet feed mechanism 32 mainly includes a sheet feed roller 32A, a separation roller 32B, and a separation pad 32C.

In the feeder unit 3, the sheet feed roller 32A feeds sheets 33 from the stack of sheets 33 placed on the sheet feed tray 31, and the sheets 33 are separated one from the other when passing through between the separation roller 32B and the separation pad 32C and fed to the process cartridge 5.

The scanner 4 is located in a front portion of the main body casing 2 and configured to scan the surface of a photoconductor drum 61 to be described later with a laser beam. Details of the scanner 4 will be described later.

The process cartridge 5 is located in a rear portion of the main body casing 2 in or around a center portion in the upper-lower direction and above the sheet feed mechanism 32. The process cartridge 5 is detachably attached to the main body casing 2. When a top cover 24 pivotally supported by the main body casing 2 is swung open to expose an opening 21A, the process cartridge 5 can be detached from and attached to the main body casing 2 through the opening 21A in a frontward and upward direction. The process cartridge 5 includes a drum unit 6, and a development cartridge 7.

The drum unit 6 includes a photoconductor drum 61, a charger 62, and a transfer roller 63. The development cartridge 7 includes a development roller 71 and a supply roller 72.

In the development cartridge 7, toner stored in a toner storage chamber is supplied to the development roller 71 by the supply roller 72, during which the toner is frictionally charged and carried on the development roller 71. In the drum unit 6, the surface of the rotating photoconductor drum 61 is uniformly charged by the charger 62 and then exposed to a rapidly sweeping laser beam from the scanner 4. Accordingly, an electrostatic latent image based on image data is formed on the surface of the photoconductor drum 61.

The toner in the development cartridge 7 is then supplied to the electrostatic latent image, so that a toner image is formed on the surface of the photoconductor drum 61. Thereafter, while a sheet 33 is conveyed through between the photoconductor drum 61 and the transfer roller 63, the toner image carried on the surface of the photoconductor drum 61 is transferred onto the sheet 33.

The fixing device 8 is located in a rear upper portion of the main body casing 2 at a position above the process cartridge 5. The fixing device 8 mainly includes a heating roller 81 and a pressure roller 82.

In the fixing device 8 configured as described above, the toner transferred onto the sheet 33 is thermally fixed while the sheet 33 passes through between the heating roller 81 and the pressure roller 82. The sheet 33 with the toner thermally fixed thereon by the fixing device 8 is conveyed to a sheet ejection roller 9 which is disposed downstream from the fixing device 8, and then ejected out through the sheet ejection roller 9 onto the top cover 24.

Figure 2:
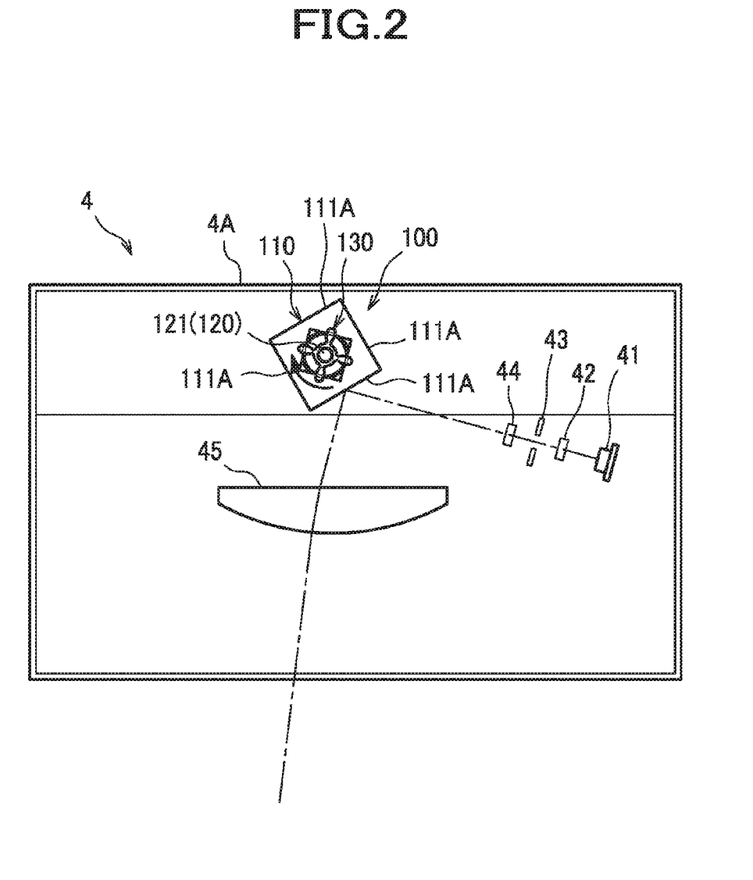
FIG. 2 is a top view of a scanner.

As seen in FIGS. 1 and 2, the scanner 4 includes in a casing 4A a semiconductor laser 41, a coupling lens 42, an aperture stop 43, a cylindrical lens 44, a light deflector 100, a scanning lens 45, and other parts. As shown by the chain lines in FIGS. 1 and 2, laser light emitted from the semiconductor laser 41 passes through the coupling lens 42, the aperture stop 43, the cylindrical lens 44, the light deflector 100, and the scanning lens 45 in this order, and is then focused on the photoconductor drum 61.

As seen in FIG. 2, the semiconductor laser 41 emits divergent laser light. The semiconductor laser 41 is regulated to cause the laser light to blink on and off in accordance with the image to be formed with the laser light on the surface of the photoconductor drum 61 under control of a controller (not shown).

The coupling lens 42 is a lens configured to convert (collimate) laser light emitted from the semiconductor laser 41 into light beam. The aperture stop 43 defines the diameter of the light beam formed by the coupling lens 42. The cylindrical lens 44 is a lens configured to bring the light beam having passed through the aperture stop 43 into focus on a polygon mirror 110 to be described later in the sub-scanning direction (i.e., direction orthogonal to the drawing sheet of FIG. 2).

As seen in FIG. 1, the light deflector 100 includes a polygon mirror 110 configured to deflect the laser beam having passed through the cylindrical lens 44 in the main scanning direction, a motor 120 configured to rotate the polygon mirror 110, and a pressing member 130 configured to attach the polygon mirror 110 to the motor 120. Details of the light deflector 100 will be described later.

As seen in FIG. 2, the scanning lens 45 is a lens configured to bring the light beam having been reflected and thus deflected by the polygon mirror 110 into focus on the surface of the photoconductor drum 61. The scanning lens 45 has f-theta characteristics such that the light beam deflected at a constant angular velocity by the polygon mirror 110 is converted into a laser beam that scans the surface of the photoconductor drum 61 at a constant linear velocity.

Details of the light deflector 100 will be described below.

Figure 3:
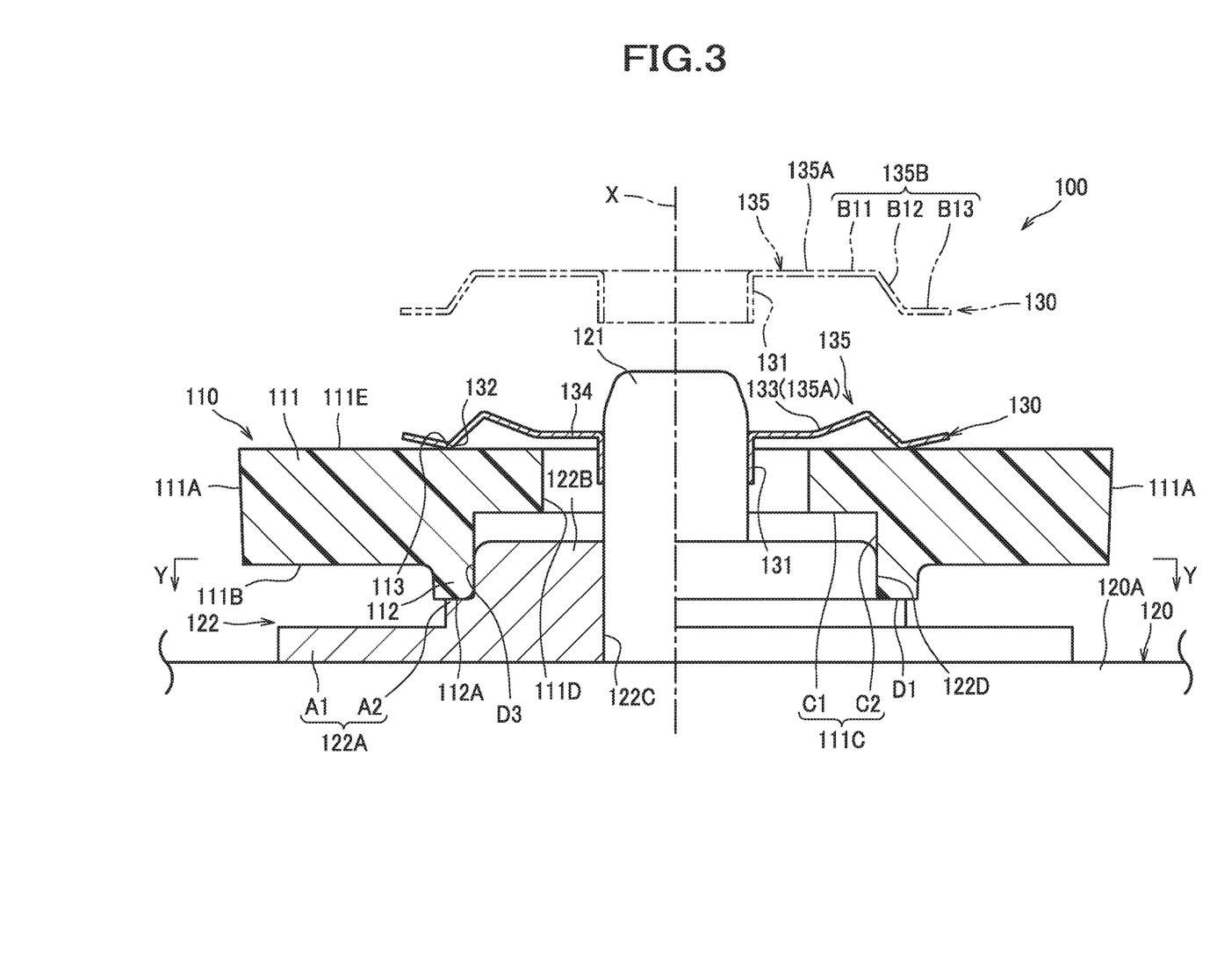
FIG. 3 is a sectional view of a light deflector.

As seen in FIG. 3, the motor 120 includes a drive portion 120A configured to generate rotary force, a shaft 121 configured to be rotated by the drive portion 120A, and a rotor 122 configured to rotate together with the shaft 121.

The rotor 122 is a metal part configured to support the polygon mirror 110. The rotor 122 includes a base portion 122A extending in a direction orthogonal to an axis of rotation X of the shaft 121, and a first protruding portion 122B protruding from a center portion of the base portion 122A in the upper-lower direction (i.e., in a direction of the axis of rotation X).

The base portion 122A includes a base portion main body A1 in the shape of a circular disk, and a ring-shaped second protruding portion A2 protruding upward from an upper surface of the base portion main body A1. The second protruding portion A2 is provided adjoining a proximal-end of the first protruding portion 122B and concentric with the first protruding portion 122B (see also FIG. 5).

The first protruding portion 122B has a circular cylindrical shape, and a through-hole 122C through which the shaft 121 passes is formed in a center portion of the first protruding portion 122B.

The polygon mirror 110 is made of plastic (e.g., made by injection molding). The polygon mirror 110 is attached to the rotor 122 of the motor 120. The polygon mirror 110 includes a main body portion 111 having four reflecting surfaces 111A (see also FIG. 2), and protruding portions 112 protruding from a lower surface (bottom surface) 111B of the main body portion 111 that faces to the rotor 122, toward the rotor 122. The main body portion 111 and the protruding portions 112 are formed integrally with each other.

The main body portion 111 is in the shape of a rectangular prism having a substantially square cross-section, and has four side surfaces. Reflecting films made of aluminum or the like are evaporated onto the side surfaces to form the reflecting surfaces 111A. The main body portion 111 has a recessed portion 111C that is recessed upward farther than distal end faces 112A of the protruding portions 112.

The recessed portion 111C is formed by a second bottom surface C1 in the shape of a rectangle (in particular, square), and inner surfaces C2 respectively extending downward from the sides of the second bottom surface C1 and facing to the shaft 121 (axis of rotation X). The axis of rotation X passes through the center of the second bottom surface C1. A through-hole 111D is formed in the center of the second bottom surface C1; the through-hole 111D pieces through the second bottom surface C1 in the upper-lower direction.

Figure 5:
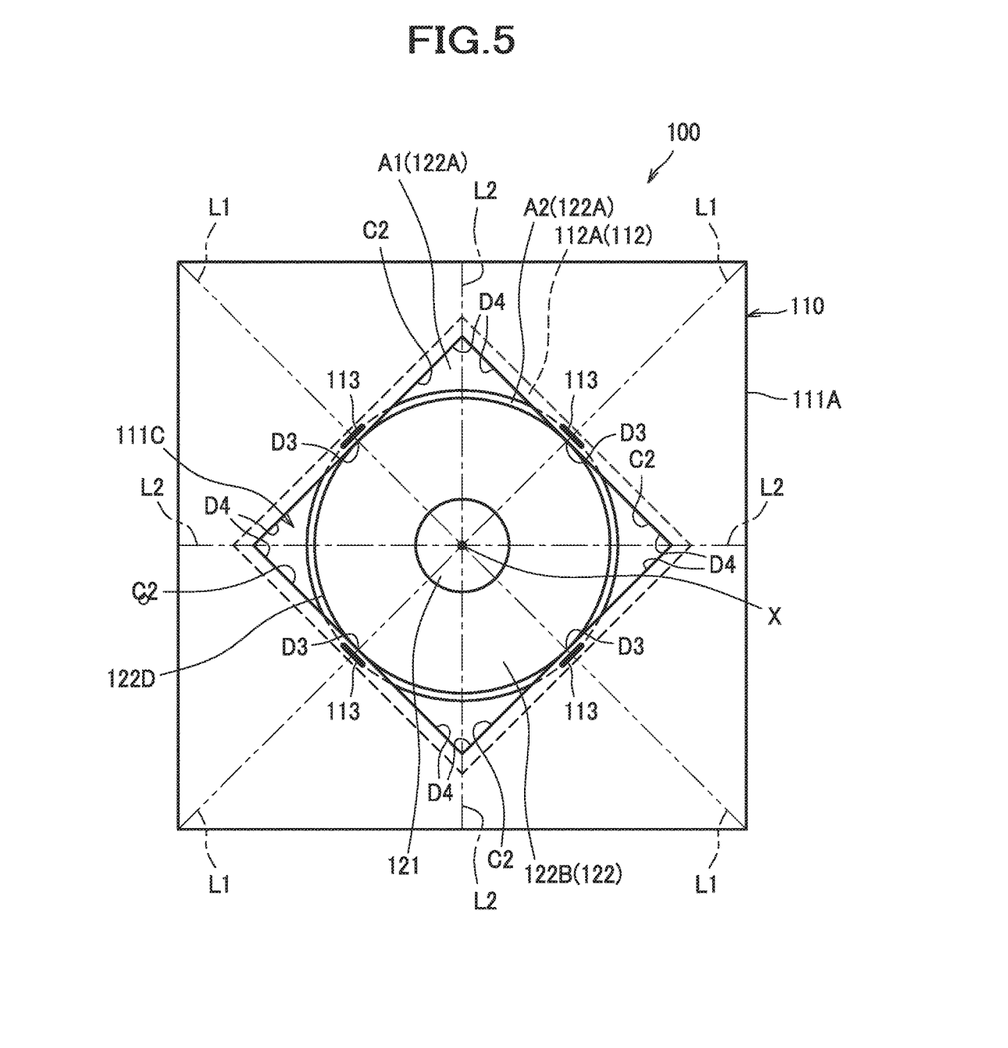
FIG. 5 is a sectional view taken along the line Y-Y of FIG. 3.

The first protruding portion 122B of the rotor 122 is fitted in the recessed portion 111C with the outer peripheral surface 122D thereof contacting the inner surfaces C2 (see also FIG. 5). To be more specific, the inner surfaces C2 of the polygon mirror 110 contact the outer peripheral surface 122D of the first protruding portion 122B at inner contacting portions D3, but do not contact the outer peripheral surface 122D of the first protruding portion 122B at inner non-contacting portions D4 (see also FIG. 5). The shaft 121 of the motor 120 is inserted in the through-hole 111D and thus passes through the through-hole 111D from bottom to top.

Figure 4:
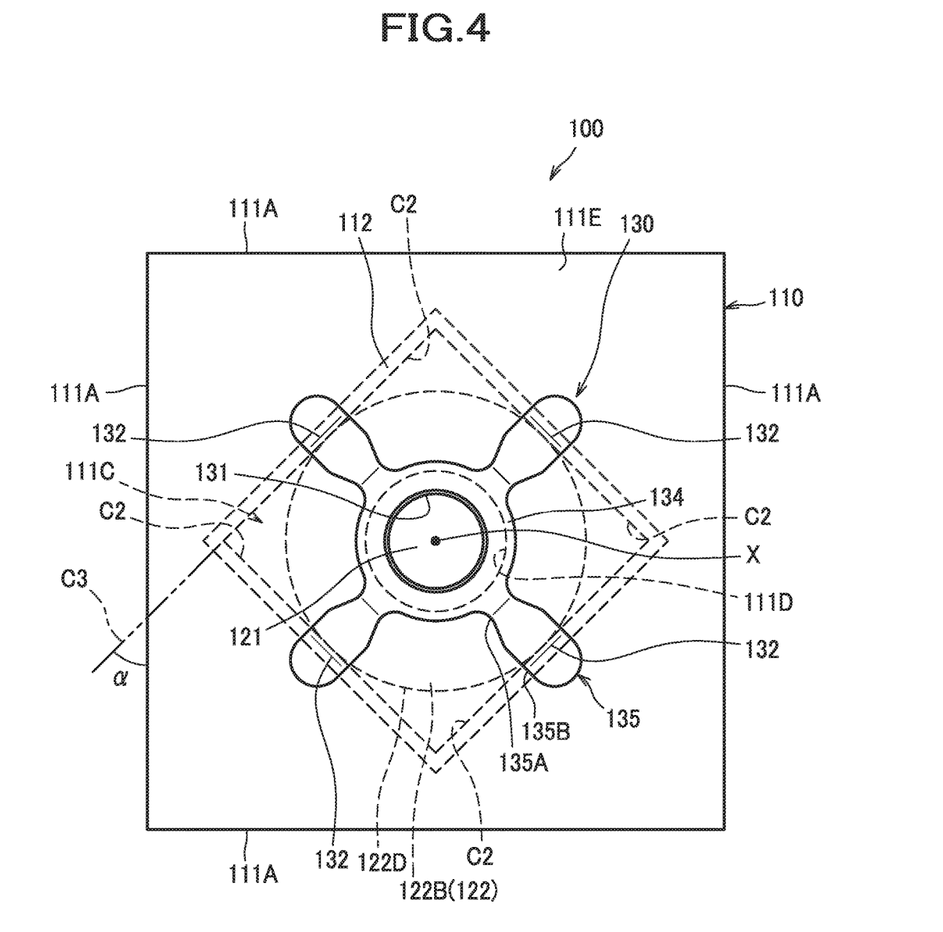
FIG. 4 is a top view of the light deflector as viewed from above.

As seen in FIGS. 3 and 4, the through-hole 111D has a circular shape with its center coincide with the axis of rotation X. The through-hole 111D has a diameter greater than the outer periphery of the shaft 121 of the motor 120 but smaller than the outer periphery of the first protruding portion 122B.

As seen in FIG. 4, each of the inner surfaces C2 is a flat surface. The number of inner surfaces C2 provided is four that is the same as the number of reflecting surfaces 111A. The four inner surfaces C2 are arranged as a substantially square configuration (rectangular configuration) such that the axis of rotation X of the motor 120 passes through the center thereof. For this reason, the protruding portions 112 are arranged as a substantially square configuration surrounding the axis of rotation X.

As viewed from the upper-lower direction, the inner surfaces C2 are slanted at 45 degrees with respect to the reflecting surfaces 111A. In other words, an angle α between an extension C3 of each of the inner surfaces C2 and the reflecting surface 111A with which the extension intersects is 45 degrees.

It should be noted that the first protruding portion 122B of the rotor 122 configured as described above is arranged as an inscribed circle of the squarely arranged four inner surfaces C2; the first protruding portion 122B contacts the inner surfaces C2 at four points in total, i.e., one point for each of the inner surfaces C2.

Figure 6:
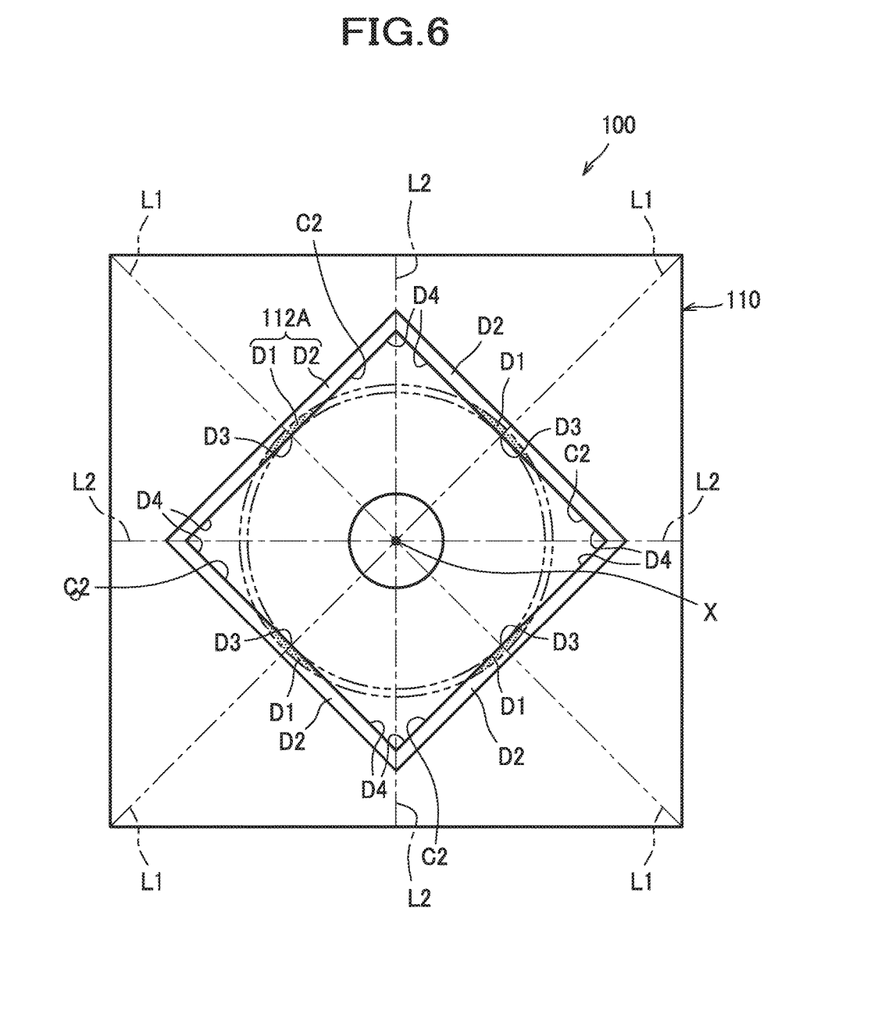
FIG. 6 is a bottom view of the polygon mirror.

The protruding portions 112 protrude from the lower surface 111B of the main body portion 111 of the polygon mirror 110, so that as viewed from the diametrical direction thereof, the protruding portions 112 are disposed at positions avoiding (not overlapping) the reflecting surfaces 111A. The protruding portions 112 contact the rotor 122 such that the distal end faces 112A thereof contact the second protruding portion A2 of the base portion 122A of the rotor 122 in the upper-lower direction. As see in FIG. 6, the distal end faces 112A of the protruding portions 112 contact the second protruding portion A2 at contacting portions D1, but does not contact the second protruding portion A2 at non-contacting portions D2. In FIG. 6, the contacting portions D1 are shown by hatching. As seen in FIG. 3, the width of each of the protruding portions 112 is greater than the width of the second protruding portion A2 (i.e., the width of the second protruding portion A2 spanning from the outer peripheral surface 122D of the first protruding portion 122B to the outer edge of the second protruding portion A2 in the radial direction) (see also FIG. 5).

As seen in FIGS. 3 and 4, the pressing member 130 is a member having springiness for pressing the polygon mirror 110 against the rotor 122. The pressing member 130 includes an engagement portion 131 configured to be engageable with the shaft 121, pressing portions 132 configured to contact an upper surface 111E of the polygon mirror 110, and midportions 133 disposed between the engagement portion 131 and the pressing portions 132.

The engagement portion 131 has a circular cylindrical shape and is configured to be fitted onto the shaft 121 to press the shaft 121 in a radially inward direction. When the pressing member 130 is attached to the shaft 121, the pressing member 130 is elastically deformed such that the position of the engagement portion 131 with respect to the pressing portions 132 is relatively lower as compared to the position of the engagement portion 131 before the attachment of the pressing member 130 to the shaft 121. An annular flange portion 134 is provided at the upper end of the engagement portion 131, and extends therefrom radially outward.

Four arm portions 135 are arranged at the peripheral edge of the annular flange portion 134. The four arm portions 135 are evenly provided with one arm portion spaced apart from two other circumferentially adjacent arm portions and extend radially outward from the peripheral edge of the annular flange portion 134. Each of the arm portions 135 has a narrowed portion 135A configured such that a width thereof gradually decreases and thereafter gradually increases with increasing distance away from the peripheral edge of the annular flange portion 134 in a radially outward direction, and an end portion 135B configured to extend radially outward from the narrowed portion 135 with a constant width.

The narrowest portion of the narrowed portion 135A functions as a midportion 133. Namely, the midportion 133 has a width smaller than that of the pressing portion 132. With this configuration, the arm portions 135 deform at the midportions 133 when the pressing member 130 is attached to the shaft 121.

As shown by the chain double-dashed lines in FIG. 3, the end portion 135B has a first portion B11, a second portion B12, and a third portion B13. In a state before the pressing member 130 is attached to the shaft 121, the first portion B11 extends radially outward from the narrowed portion 135A, the second portion B12 extends obliquely from the distal end of the first portion B11 in a radially outward and downward direction, and the third portion B13 extends radially outward from the distal end of the second portion B12. A boundary portion (bent portion) between the second portion B12 and the third portion B13 comes into contact with the upper surface 111E of the polygon mirror 110 when the pressing member 130 is attached to the shaft 121, to thereby function as the pressing portion 132 for pressing the upper surface 111E.

As seen in FIG. 4, the pressing portions 132 are located in a radial range in which the protruding portions 112 as described above are provided. As seen in FIG. 5, those portions of the polygon mirror 110 which are pressed by the pressing portions 132 function as pressed portions 113. The pressed portions 113 are located in radial positions at which the distal end faces 112A of the protruding portions 112 and the second protruding portion A2 contact each other. In other words, as viewed from the upper-lower direction, the pressing portions 132 press the polygon mirror 110 at positions corresponding to (overlapping) the contacting portions D1 of the distal end faces 112A of the protruding portions 112. For ease of reference, the pressed portions 113 which are a part of the upper surface 111E of the polygon mirror 110 are shown by the thick lines in FIG. 5.

It should be noted that the distal end faces 112A of the protruding portions 112 contact the second protruding portion A2 of the rotor 122 at four contacting portions D1, and the four pressing portions 132 press the polygon mirror 110 at position corresponding to the contacting portions D1. To be more specific, as viewed from the upper-lower direction, each of the contacting portions D1 contacts the second protruding portion A2 of the rotor 122 at a position in which a line segment L1 connecting the axis of rotation X and each of vertexes of the polygon mirror 110 intersects (overlaps) the distal end face 112A of each of the protruding portions 112.

Further, the outer diameter of the second protruding portion A2 is smaller than a diagonal line of a square that is made by the inner surfaces C2 of the polygon mirror 110, and the non-contacting portions D2 of the distal end faces 112A are defined. For this reason, the second protruding portion A2 is located on a perpendicular L2 dropped from the axis of rotation X to a reflecting surface 111A at a position away from the distal end faces 112A of the protruding portions 112 of the polygon mirror 110. In other words, as viewed from the upper-lower direction, each of the distal end faces 112A of the protruding portions 112 does not contact the second protruding portion A2 at a position in which the perpendicular L2 intersects (overlaps) the distal end faces 112A (i.e., the perpendicular L2 intersects (overlaps) the non-contacting portions D2 of the distal end faces 112A).

Further, the inner surfaces C2 of the recessed portion 111C contact the outer peripheral surface 122D of the first protruding portion 122B of the rotor 122 at four inner contacting portions D3 only on the four line segments L1. In other words, as viewed from the upper-lower direction, the inner surfaces C2 contact the outer peripheral surface 122D of the first protruding portion 122B at positions (at the inner contacting portions D3) in which the line segments L1 intersect the inner surfaces C2. Further, as viewed from the upper-lower direction, the inner surfaces C2 do not contact the outer peripheral surface 122D of the first protruding portion 122B at positions (at the inner non-contacting portions D4) in which the perpendiculars L2 intersect the inner surfaces C2.

With the configuration described above, the following advantageous effects can be achieved.

The distal end faces 112A of the protruding portions 112 of the polygon mirror 110 do not contact the second protruding portion A2 of the rotor 122 at positions (at the non-contacting portions D2) in which the perpendiculars L2 overlap (intersect) the distal end faces 112A, so that heat is less likely to be transferred from the rotor 122 to the reflecting surfaces 111A. In particular, the distal end faces 112A of the protruding portions 112 do not contact the second protruding portion A2 except at the four contacting portions D1 on the line segments L1, so that heat transfer to the reflecting surfaces 111A can be greatly reduced. This can suppress deformation of the reflecting surfaces 111A of the polygon mirror 110 due to thermal expansion. Further, even if heat is transferred to the polygon mirror 110, the heat will be transferred to each reflecting surface 111A from both ends thereof, so that the flatness of the reflecting surface 111A is unlikely to be impaired.

The inner surfaces C2 of the recessed portion 111C of the polygon mirror 110 do not contact the outer peripheral surface 122D of the first protruding portion 122B of the rotor 122 at positions (at the inner non-contacting portions D4) in which the perpendiculars L2 intersect the inner surfaces C2, so that heat is much less likely to be transferred from the rotor 122 to the reflecting surfaces 111A. In particular, the inner surfaces C2 of the recessed portion 111C do not contact the outer peripheral surface 122D of the first protruding portion 122B except at the four inner contacting portions D3 on the line segments L1, so that heat transfer to the reflecting surfaces 111A can be greatly reduced. This can further suppress deformation of the reflecting surfaces 111A of the polygon mirror 110 due to thermal expansion.

The polygon mirror 110 has protruding portions 112, so that the lower surface 111B of the polygon mirror 110 can be distanced from the base portion main body A1 of the base portion 122A of the rotor 122. Therefore, heat from the motor 120 is less likely to be transferred to the polygon mirror 110.

The protruding portions 112 are arranged as a substantially square configuration surrounding the axis of rotation X, so that the rigidity of the polygon mirror 110 as well as the heat-radiating effect of the polygon mirror 110 can be enhanced as compared with an alternative configuration in which protruding portions are provided only at portions in contact with the second protruding portion.

The pressing portions 132 press the upper surface 111E of the polygon mirror 110 at positions corresponding to (overlapping) the contacting portions D1 of the distal end faces 112A of the protruding portions 112, so that deformation of the polygon mirror 110 due to the pressing of the pressing member 130 can be suppressed.

The lower surface 111B of the polygon mirror 110 and the base portion main body A1 of the base portion 122A of the rotor 122 can be spaced apart from each other on the perpendiculars L2 by the provision of the second protruding portion A2. This makes it possible, with a simple configuration, to hardly transfer heat from the motor 120 to the polygon mirror 110.

Further, the width of the second protruding portion A2 (i.e., the width of the second protruding portion A2 spanning from the outer peripheral surface 122D of the first protruding portion 122B to the outer edge of the second protruding portion A2 in the radial direction) is smaller than the width of the protruding portions 112 of the polygon mirror 110, so that the contacting area between the protruding portions 112 and the second protruding portion A2 can be reduced as compared with an alternative configuration in which the width of the second protruding portion is greater than the width of the protruding portions.

The through-hole 111D having a size smaller than the outer periphery of the first protruding portion 122B of the rotor 122 is formed in the second bottom surface C1 of the recessed portion 111C of the polygon mirror 110, so that rigidity of the polygon mirror 110 can be enhanced as compared with an alternative configuration in which a through-hole having a size substantially equal to the outer periphery of the first protruding portion is formed in the second bottom surface. Unlike the alternative configuration, this configuration can suppress deformation of the polygon mirror 110 due to centrifugal force.

The through-opening 111D is circular in shape, so that the rigidity of the polygon mirror 110 can be further enhanced.

Further, the inner surfaces C2 are arranged as a rectangular configuration, so that one contacting portion D1 can be separated by a great distance from two other adjacent contacting portions D1 as compared with an alternative configuration in which the inner surfaces C2 are arranged as a hexagonal configuration. Further, the angle α between the inner surfaces C2 and the reflecting surfaces 111A is 45 degrees, so that the contacting portions D1 of the distal end faces 112A of the protruding portions 112 can be separated by a great distance with respect to the perpendiculars L2 as compared with an alternative configuration in which the angle is set to a value other than 45 degrees. Namely, the contacting portions D1 can be distanced (remote) from the reflecting surfaces 111A, so that heat is much less likely to be transferred from the motor 120 to the reflecting surfaces 111A.

It is to be understood that various changes and modifications, such as those described below, may be made to the specific configurations described above by way of example without departing from the scope of the appended claims.

The polygon mirror 110 described above has a square-shaped recessed portion 111C into which the first protruding portion 122B of the rotor 122 is fitted. However, the present invention is not limited to this specific configuration. For example, the polygon mirror may be configured to have a square through-opening into which the first protruding portion 122B is fitted.

Each of the inner surfaces C2 that is a flat surface is described above. However, the present invention is not limited to this specific configuration, and each of the inner surfaces C2 may not be a flat surface.

The plurality of inner surfaces C2 described above are arranged as a substantially square configuration. However, the present invention is not limited to this specific configuration. For example, if the polygon mirror is in the shape of a regular hexagonal prism, the inner surfaces may be arranged as a regular hexagonal configuration.

The base portion 122A of the rotor 122 described above has the second protruding portion A2. However, the present invention is not limited to this specific configuration, and the base portion may be configured to have no second protruding portion. In this modification, it may be preferable that the base portion of the rotor has an outer diameter same as that of the second protruding portion configured as described above.

In each of the above description, the laser printer 1 has been described as an example of an image forming apparatus. However, the present invention is not limited to such laser printers, and may be applicable to other image forming apparatuses such as a copying machine and a multifunction peripheral.

What is claimed is:

1. A light deflector comprising:
   a polygon mirror made of plastic and having a plurality of reflecting surfaces;
   a motor configured to rotate on an axis of rotation; and
   a rotor configured to be rotatable by the motor, and including a base portion intersecting the axis of rotation, and a first protruding portion having a circular cylindrical shape and protruding from the base portion in a direction of the axis of rotation,
   wherein the polygon mirror has an inner surface contacting an outer peripheral surface of the first protruding portion of the rotor, and a bottom surface facing to the rotor in the direction of the axis of rotation,
   wherein the bottom surface of the polygon mirror has a contacting portion configured to contact the base portion of the rotor, and the contacting portion overlaps a line segment connecting the axis of rotation and any of vertexes of the polygon mirror viewed from the direction of the axis of rotation, and
   wherein the bottom surface of the polygon mirror has a non-contacting portion configured to be spaced apart from the base portion of the rotor, and the non-contacting portion overlaps a perpendicular dropped from the axis of rotation to any of the reflecting surfaces viewed from the direction of the axis of rotation.

2. The light deflector according to claim 1, wherein the polygon mirror has a protruding portion configured to protrude from the bottom surface toward the rotor in the direction of the axis of rotation, and
   wherein a distal end face of the protruding portion forms the contacting portion.

3. The light deflector according to claim 2, wherein the protruding portion has a shape surrounding the axis of rotation.

4. The light deflector according to claim 1, further comprising:
   a pressing member configured to press an upper surface of the polygon mirror that is on an opposite side of the bottom surface,
   wherein viewed from the direction of the axis of rotation, the pressing member presses the polygon mirror at a position overlapping the contacting portion.

5. The light deflector according to claim 1, wherein the base portion of the rotor comprises a second protruding portion protruding toward the polygon mirror and a protruding end of the second protruding portion contacts the contacting portion.

6. The light deflector according to claim 5, wherein the second protruding portion has a circular shape concentric with the first protruding portion.

7. The light deflector according to claim 1, wherein the polygon mirror has a recessed portion recessed from the bottom surface,
   wherein the recessed portion comprises the inner surface and a second bottom surface,
   wherein a through-hole is formed in the second bottom surface, the through-hole having a size smaller than an outer periphery of the first protruding portion of the rotor, and
   wherein the motor has a shaft configured to pass through the through-hole.

8. The light deflector according to claim 7, wherein the through-hole is circular in shape.

9. The light deflector according to claim 1, wherein the inner surface of the polygon mirror has an inner contacting portion configured to contact the outer peripheral surface of the first protruding portion of the rotor, and the inner contacting portion overlaps the line segment viewed from the direction of the axis of rotation, and
   wherein the inner surface of the polygon mirror has an inner non-contacting portion configured to be spaced apart from the outer peripheral surface of the first protruding portion of the rotor, and the inner non-contacting portion overlaps the perpendicular viewed from the direction of the axis of rotation.

10. The light deflector according to claim 9, wherein the inner contacting portion is a flat surface.

11. The light deflector according to claim 10, wherein the inner contacting portion is one of a plurality of inner contacting portions provided at plural positions, and a number of the plurality of inner contacting portions is the same as a number of the reflecting surfaces.

12. The light deflector according to claim 11, wherein the inner surface is one of a plurality of inner surfaces provided at plural positions, and the plurality of inner surfaces are arranged as a rectangular configuration, and wherein the inner surfaces are slanted at 45 degrees with respect to the reflecting surfaces.

13. An image forming apparatus comprising:

a photoconductor configured to carry an electrostatic latent image;

a light source configured to emit a light beam;

a light deflector configured to deflect the light beam emitted from the light source; and a scanning lens configured to focus the light beam deflected by the light deflector on the photoconductor, wherein the light deflector comprises:

a polygon mirror made of plastic and having a plurality of reflecting surfaces;

a motor configured to rotate on an axis of rotation; and a rotor configured to be rotatable by the motor, and including a base portion intersecting the axis of rotation, and a first protruding portion having a circular cylindrical shape and protruding from the base portion in a direction of the axis of rotation, wherein the polygon mirror has an inner surface contacting an outer peripheral surface of the first protruding portion of the rotor, and a bottom surface facing to the rotor in the direction of the axis of rotation, wherein the bottom surface of the polygon mirror has a contacting portion configured to contact the base portion of the rotor, and the contacting portion overlaps a line segment connecting the axis of rotation and any of vertexes of the polygon mirror viewed from the direction of the axis of rotation, and wherein the bottom surface of the polygon mirror has a non-contacting portion configured to be spaced apart from the base portion of the rotor, and the non-contacting portion overlaps a perpendicular dropped from the axis of rotation to any of the reflecting surfaces viewed from the direction of the axis of rotation.

14. The image forming apparatus according to claim 13, wherein the polygon mirror has a protruding portion configured to protrude from the bottom surface toward the rotor in the direction of the axis of rotation, and wherein a distal end face of the protruding portion forms the contacting portion.

15. The image forming apparatus according to claim 13, further comprising:

a pressing member configured to press an upper surface of the polygon mirror that is on an opposite side of the bottom surface, wherein viewed from the direction of the axis of rotation, the pressing member presses the polygon mirror at a position overlapping the contacting portion.

16. The image forming apparatus according to claim 13, wherein the base portion of the rotor comprises a second protruding portion protruding toward the polygon mirror and a protruding end of the second protruding portion contacts the contacting portion.

17. The image forming apparatus according to claim 13, wherein the polygon mirror has a recessed portion recessed from the bottom surface, wherein the recessed portion comprises the inner surface and a second bottom surface, wherein a through-hole is formed in the second bottom surface, the through-hole having a size smaller than an outer periphery of the first protruding portion of the rotor, and wherein the motor has a shaft configured to pass through the through-hole.

18. The image forming apparatus according to claim 13, wherein the inner surface of the polygon mirror has an inner contacting portion configured to contact the outer peripheral surface of the first protruding portion of the rotor, and the inner contacting portion overlaps the line segment viewed from the direction of the axis of rotation, and wherein the inner surface of the polygon mirror has an inner non-contacting portion configured to be spaced apart from the outer peripheral surface of the first protruding portion of the rotor, and the inner non-contacting portion overlaps the perpendicular viewed from the direction of the axis of rotation.

19. The image forming apparatus according to claim 18, wherein the inner contacting portion is a flat surface.

* * * * *